United States Patent [19]
Ott

[11] Patent Number: 5,786,046
[45] Date of Patent: Jul. 28, 1998

[54] DECORATIVE ACCESSORY FOR ATTACHMENT TO THE GRILLE OF A VEHICLE

[76] Inventor: Roderick L. Ott, 790 N. Cedar Bluff Rd., Apt. #2907, Knoxville, Tenn. 37923

[21] Appl. No.: 465,064

[22] Filed: Jun. 5, 1995

[51] Int. Cl.[6] ............................................. B60R 13/04
[52] U.S. Cl. ..................... 428/31; 428/66.5; 428/66.6; 428/99; 280/727
[58] Field of Search .................. 428/31, 66.5, 66.6, 428/99; 280/727

[56] References Cited

U.S. PATENT DOCUMENTS 4,025,158  5/1977  Tsuyama ................................. 428/31

*Primary Examiner*—Alexander Thomas
*Attorney, Agent, or Firm*—Michael E. McKee

[57] ABSTRACT

A decorative accessory for attachment to the grille of a vehicle having spaced bars includes a decorative portion positionable against the front surface of the grille and an attachment portion positionable against the rear surface of the grille. The decorative portion includes a first planar disc, a cushioning pad adhesively secured to one face of the first disc, and a bolt having a head which is attached to the cushioned face of the first disc. The face of the first disc opposite the cushioned face thereof bears decorative indicia, and the longitudinal axis of the threaded shank is arranged so as to be substantially normal to the plane of the first disc. The attachment portion is used with a wing nut to secure the decorative portion to the front of the vehicle grille.

8 Claims, 2 Drawing Sheets

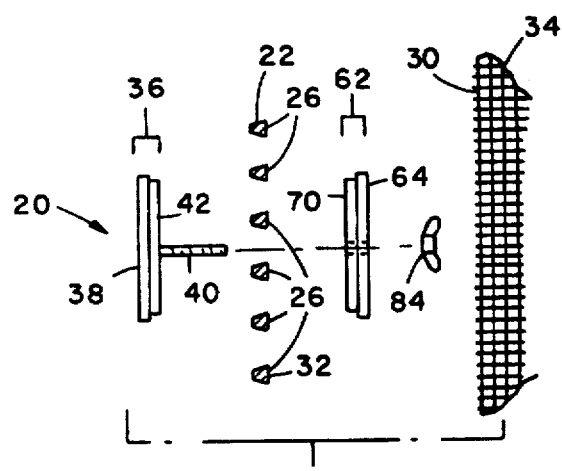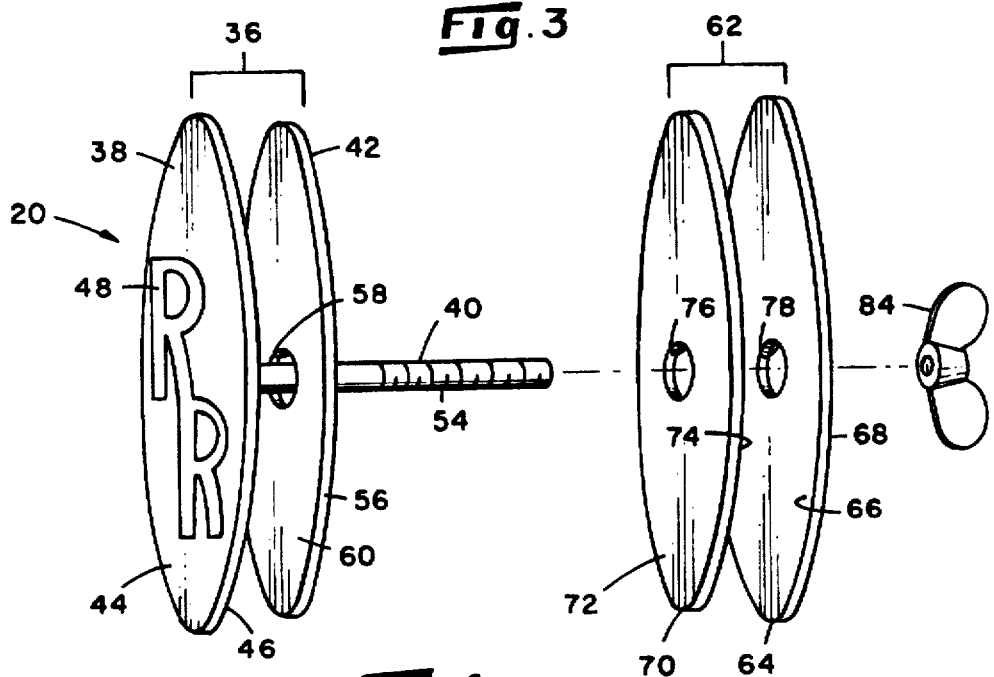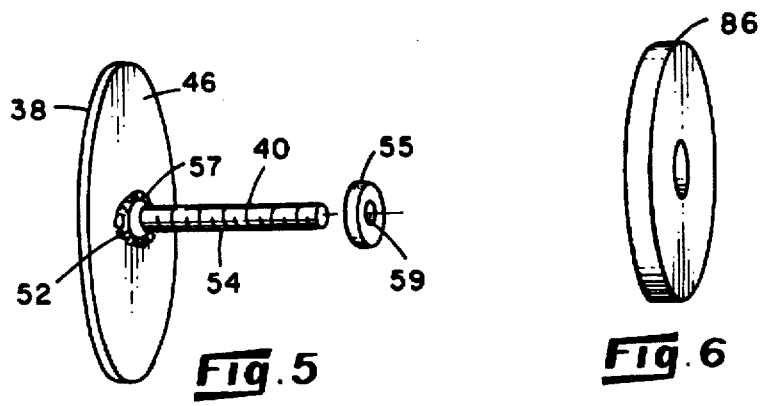

5,786,046

1

DECORATIVE ACCESSORY FOR ATTACHMENT TO THE GRILLE OF A VEHICLE

BACKGROUND OF THE INVENTION

This invention relates generally to vehicle accessories and relates, more particularly, to a decorative item attachable to a vehicle for enhancing the appearance thereof.

The class of vehicle with which this invention is concerned includes a grill on the front thereof and wherein the front grill includes a plurality of spaced bars which extend across the grill.

It is an object of the present invention to provide a new and improved decorative accessory for attachment to a vehicle of the aforedescribed class by way of the front grill thereof.

Another object of the present invention is to provide such an accessory which is uncomplicated in construction, can be readily attached and detached from a front grille and prevents damage to a vehicle when attached thereto.

SUMMARY OF THE INVENTION

This invention resides in a decorative accessory for attachment to the grille of a vehicle wherein the grille includes spaced bars having front and rear surfaces.

The accessory includes a decorative portion positionable against the bars of a grille on the front surfaces thereof and including a first substantially planar disc, an elongated threaded shank and first cushioning means. The first disc has two opposite faces and one of the faces bears indicia, and the threaded shank is secured to the face of the first disc opposite said one face so that the longitudinal axis of the shank is arranged substantially normal to the plane of the first disc. In addition, the first cushioning means is attached to the face of the first disc opposite the one face for cushioning the face of the first disc opposite the one face when placed against the bars of the grille.

The accessory also includes an attachment portion positionable against the bars of the grille on the rear surfaces thereof and includes a second substantially planar disc and second cushioning means. The second disc includes opposite first and second faces and defines a hole extending between the two faces of the second disc, and the second cushioning means is attached to a first face of the second disc for cushioning said first face when it is placed against the bars of the grille. A nut within the accessory is capable of being threadably secured upon the threaded shank so that when the first disc is placed cushioned-face-first against the front surfaces of the bars of the grille so that the threaded shank extends between the grille bars and the second disc can be positioned cushioned-face-first against the rear surfaces of the grille bars and so that the threaded shank of the decorative portion is accepted by the hole provided in the second disc, the nut can be threadably secured and tightened upon the shank so that the grille is captured between the first and second discs to thereby secure the accessory to the grille.

BRIEF DESCRIPTION OF THE DRAWINGS

FIG. 3 is a cross-sectional view of a portion of the FIG. 1 vehicle taken about line 3—3 of FIG. 1.

2

Figure 1:
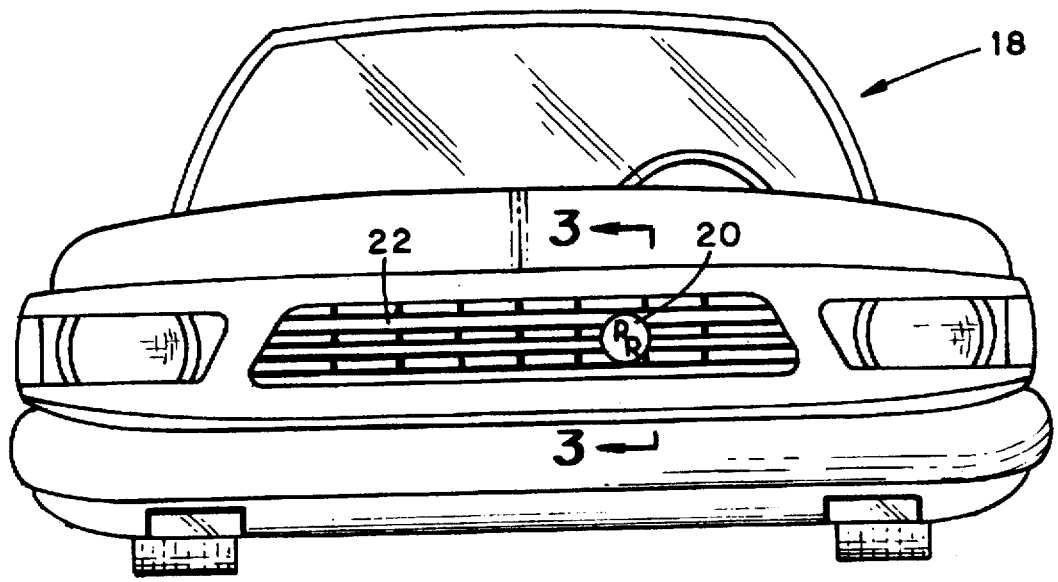
FIG. 1 is a front elevational view of a vehicle to which an embodiment of an accessory is attached.

FIG. 4 is a perspective view of the FIG. 1 accessory, shown exploded.

FIG. 5 is a perspective view of part of the FIG. 4 accessory, shown exploded.

FIG. 6 is a perspective view of a spacer element which can be used with the FIG. 4 accessory.

DETAILED DESCRIPTION OF THE ILLUSTRATED EMBODIMENT

Figure 2:
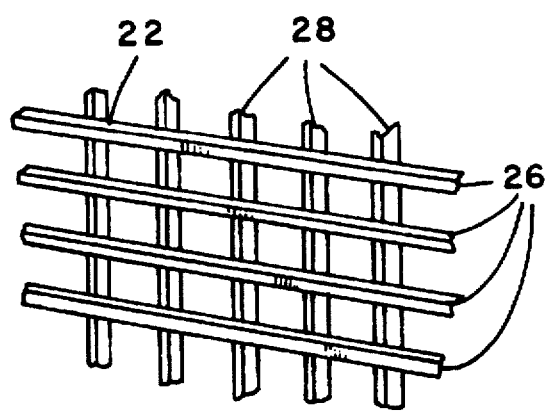
FIG. 2 is a perspective view of a fragment of the grille of the FIG. 1 vehicle.

Turning now to the drawings in greater detail, there is shown in FIG. 1 a vehicle 18 having a front grille 22 to which an embodiment, generally indicated 20, of an accessory is releasably attached. As best shown in FIG. 2, the grille 22 of the depicted vehicle 18 includes a plurality of substantially horizontally-extending, spaced bars 26 and a plurality of substantially vertically-extending, spaced bars 28 which are secured to one another in somewhat of a grid pattern. The depicted grille 22 is constructed of a relatively hard plastic, but any of a number of suitable materials can be used. In addition and as best shown in FIG. 3, a spacing 30 is provided between the back side, indicated 32, of the grille 22 and the radiator 34 of the vehicle 18. The accessory 20 is secured to the grille 22 with means, described herein, which extend between the bars 26 thereof so that the grille 22 is captured between portions of the accessory 20, and the spacing 30 accommodates the insertion of a hand between the grille 22 and the radiator 34 to effect the fastening of the accessory 20 to the grille 22.

With reference to FIG. 4, the accessory 20 includes a decorative portion 36 having a first disc 38, an elongated shank 40 and a cushioning member 42 attached to the disc 38. The disc 38 is relatively rigid and defines two opposite faces 44 and 46, and one of the faces 44 bears decorative indicia 48. The indicia 48 of the depicted accessory 20 is painted upon the face 44 of the disc 38, but it will be understood that the indicia 48 may be affixed to the disc face 44 in any of a number of ways. For example, the indicia 38 may be affixed to the disc face 44 with a decal or even embossed in the disc face 44 during a disc-forming operation.

The disc 38 of the depicted embodiment 20 is comprised of a hard plastic, such as a hard acrylic plastic, but any of a number of rigid materials can be used. In addition, the disc 38 is circular in form, but it may possess an alternative geometric form.

As best shown in FIG. 5, the elongated shank 40 is in the form of a threaded bolt 50 having a head 52 and a threaded portion 54. The bolt 50 is arranged with its head 52 positioned in abutting relationship with the disc face 46 and is secured thereto with the aid of a washer 55, constructed, for example, of an acrylic plastic. In this connection, the washer 55 is positioned over the threaded portion 54 and secured thereto with a suitable adhesive 57, such as one which chemically bonds acrylic to acrylic. Thus, by securing the washer 55 to the face 46 of the disc 38 in a manner which captures the head 52 between the washer 55 and the disc face 46, the shank 40 is secured in a substantially normal relationship with the plane of the disc 38. It follows that the washer 55 has a central opening 59 which is sized to accept the threaded portion 54, but prevent passage of the bolt head 52 therethrough. In addition, the threaded portion 54 is of sufficient length to extend through grilles having a thickness within a relatively broad range.

With reference again to FIG. 4, the cushioning member 42 includes a foam pad 56 which is substantially circular in form so as to generally match the shape of the disc face 46 and has a diameter which is slightly less than that of the disc face 46. The foam pad 56 also includes a circular hole 58 located at its geometric center to accommodate the positioning of the pad 56 against the disc face 46 so that the threaded portion 54 of the shank 40 extends through the opening 58 thereof.

The cushioning member 42 also includes a layer of adhesive 60 spread over one side of the pad 56. Thus, when the pad 56 is pressed adhesive-side first against the face 46 of the disc 38 (so that the shank 40 protrudes through the hole 58), the pad 56 is firmly secured against the disc face 46. As will be apparent herein, the pad 56 cushions the disc face 46 so that when the disc 38 is placed against the surface of the grille 22 for attachment of the accessory 20 to the grille 22, the pad 56 protects the grille 22 from damage by the disc 38.

With reference still to FIG. 4, the accessory 20 includes an attachment portion 62 with which the accessory 20 is secured to the grille 22. The attachment portion 62 includes a second disc 64 having two opposite faces 66, 68 and a cushioning member 70 which is similar in construction to that of the decorative portion 36. In other words, the cushioning member 70 includes a circular foam pad 72 having one side which is coated with a layer of adhesive 74 for adhesively securing the pad 72 to the disc 64. Thus, by pressing the pad 72 adhesive-side-first against the face 66 of the disc 64, the pad 72 is firmly secured against the disc face 66. In addition, the disc 64 and cushioning member 70 are provided with aligned openings 76, 78 in the center thereof for a reason which will be apparent herein.

As is the case with the disc 38 of the decorative portion 36, the disc 64 is comprised of a hard plastic, but any of a number of rigid materials can be used. In addition, the disc 64 is circular in form, but it may possess an alternative geometric form.

The accessory 20 further includes a wing nut 84 which is adapted to be threadably received by the threaded shank portion 54 to aid in the securement of the accessory 20 to the grille 22. The wing nut 84 is constructed of steel and is sized to prevent passage of the nut 84 through the aligned openings 76, 78 provided in the disc 46 and cushioning member 70.

To secure the accessory 20 to the grille 22, the disc 38 of the decorative portion 36 is placed against the cushioned-side-first across the front surface of the grille 22 so as to span at least two adjacent bars 26 or 28 and so that the elongated shank 40 extends between the spanned bars and into the spacing provided between the grille 22 and the radiator 34. Accordingly, the diameter of the disc 38 is large enough to prevent the disc 38 from slipping between the bars spanned by the disc 38.

With the pad 56 of the disc 38 held in position against the front surface of the grille 22, the disc 64 of the attachment portion 62 is directed cushioned-side-first over the shank 40 and pushed therealong until the cushioning member 70 abuts the rear surface of the grille 22. As is the case with the disc 38, the disc 64 is sized so as to span the adjacent bars 26 or 28 across which the disc 64 is positioned.

Next, the wing nut 84 is threaded upon the threaded portion 54 of the shank 40 and tightened against the face 68 of the disc 64 to capture the grille 22 between the discs 38 and 64 and thereby releasably secure the decorative portion 36 to the grille 22.

It follows from the foregoing that with the decorative portion 36 secured to the grille 22 in the aforedescribed manner, the indicia 48 borne on the face 44 of the disc 38 is readily viewable from the front of the vehicle 18. The appearance of the vehicle 18 is enhanced by the indicia 48, and the accessory 20 is advantageous in this respect.

Exemplary dimensions of the accessory 20 are provided here as follows. The diameter of each of the discs 38 and 64 and foam pads 56 and 72 is about 4.0 inches; the thickness of each of the discs 38 and 64 and foam pads 56 and 72 is about 0.125 inches; the diameter of the pad opening 58 is about 1.0 inches; the diameter of each of the aligned openings 76 and 78 is about 0.25 inches; the threaded bolt 50 is a size 8 screw having thirty-two grooves per inch and is about 3.5 inches in length. Because the threaded portion 54 of the bolt 50 is so thin, it can be inserted between the bars of grilles having small spacings therebetween.

It will be understood that numerous modifications and substitutions can be had to the aforedescribed embodiments without departing from the spirit and scope of the invention. For example, although the aforedescribed embodiment 20 has been shown and described as being provided with a single foam pad 56 positionable between the disc 38 of the decorative portion 36 and the front surface of the grille 22, an accessory in accordance with the broader principles of the invention can include additional foam pads or a foam pad of an alternative thickness. For example, there is shown in FIG. 6 a foam pad 86 having a thickness of about 0.5 inches for use with the accessory 20 to supplement the thickness of the foam pad 56, but a pad having a different thickness (e.g. 1.0 inches) can be employed. The additional pad 86 can be positioned upon the threaded bolt 54 before the bolt 54 is inserted between the bars of a grille in, for example, an instance in which the spacing between the rear surface of the grille and the radiator is too small to accommodate the length of the shank 40. In such an instance, the foam pad 86 acts as a spacer between the front surface of the grille and the disc 38. Accordingly, the aforedescribed embodiment 20 is intended for the purpose of illustration and not as limitation.

I claim:

1. A decorative accessory for attachment to the grille of a vehicle wherein the grille includes spaced bars having front and rear surfaces, the accessory comprising:

a decorative portion positionable against the bars of a grille on the front surfaces thereof and including a first substantially planar disc, an elongated threaded shank and first cushioning means wherein the first disc has two opposite faces and one of the faces bears indicia, the threaded shank is secured to the face of the first disc opposite said one face so that the longitudinal axis of the shank is arranged substantially normal to the plane of the first disc, and the first cushioning means is attached to the face of the first disc opposite said one face for cushioning the face of the first disc opposite said one face when placed against the bars of the grille;

an attachment portion positionable against the bars of the grille on the rear surfaces thereof and including a second substantially planar disc and second cushioning means wherein the second disc includes opposite first and second faces and defines a hole extending between the two faces of the second disc, and the second cushioning means is attached to a first face of the second disc for cushioning said first face when it is placed against the bars of the grille; and a nut capable of being threadably secured upon the threaded shank so that when the first disc is placed cushioned-face-first against the front surfaces of the bars of the grille so that the threaded shank extends between the grille bars and the second disc can be positioned cushioned-face-first against the rear surfaces of the grille bars so that the threaded shank of the decorative portion is accepted by the hole provided in the second disc, the nut can be threadably secured and tightened upon the shank so that the grille is captured between the first and second discs to thereby secure the accessory to the grille.

2. The accessory as defined in claim 1 wherein each of the first and second cushioning means includes a layer of padding which is adhesively secured to the corresponding disc so as to substantially cover the corresponding face thereof.

3. The accessory as defined in claim 2 wherein the layer of padding of each of the first and second cushioning means has a form which generally matches that of the disc to which the padding is attached.

4. The accessory as defined in claim 3 wherein each of the first and second discs is substantially circular in form, and the padding of each of the first and second cushioning means has a diameter which is slightly less than that of the disc to which the padding is attached.

5. The accessory as defined in claim 4 further including an additional foam pad positionable about the threaded shank of the decorative portion to act as a spacer between the first disc and the grille to which the accessory is attached.

6. The accessory as defined in claim 1 wherein the threaded shank is secured to the face of the first disc opposite said one face at a location corresponding to the center thereof and the hole which extends between the two faces of the second disc is defined at a location corresponding to the center thereof.

7. The accessory as defined in claim 6 wherein the threaded shank is provided by a bolt having a head which is secured in abutting relationship to the face of the first disc opposite said one face and a threaded portion which is arranged normal to the plane of the first disc.

8. The accessory as defined in claim 7 wherein the first disc is constructed of a hard plastic, and the accessory further includes an elastomeric washer positioned over the threaded portion of the bolt and adhesively secured to the face of the first disc opposite said one face so that the head of the bolt is captured between the first disc and the elastomeric washer.

* * * * *